US012671342B2

(12) United States Patent
Yang et al.

(10) Patent No.: US 12,671,342 B2
(45) Date of Patent: Jun. 30, 2026

(54) RESONANT ISOLATED DC-DC CONVERTER

(71) Applicant: ALTENERGY POWER SYSTEM INC., Jiaxing (CN)

(72) Inventors: Yongchun Yang, Jiaxing (CN); Yunjie Mo, Jiaxing (CN); Yuhao Luo, Jiaxing (CN); Biaojie Qi, Jiaxing (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 229 days.

(21) Appl. No.: 18/709,842

(22) PCT Filed: Jun. 30, 2021

(86) PCT No.: PCT/CN2021/103564
§ 371 (c)(1),
(2) Date: May 14, 2024

(87) PCT Pub. No.: WO2022/166086
PCT Pub. Date: Aug. 11, 2022

(65) Prior Publication Data
US 2025/0323580 A1      Oct. 16, 2025

(30) Foreign Application Priority Data

Feb. 8, 2021    (CN) .......................... 202110182683.7

(51) Int. Cl.
*H02M 3/335* (2006.01)
*H02M 1/00* (2006.01)
*H02M 3/00* (2006.01)

(52) U.S. Cl.
CPC ..... *H02M 3/33573* (2021.05); *H02M 1/0058* (2021.05); *H02M 3/01* (2021.05)

(58) Field of Classification Search
CPC ... H02M 3/33573; H02M 3/01; H02M 1/0058
See application file for complete search history.

(56) References Cited

U.S. PATENT DOCUMENTS

2014/0247625 A1   9/2014   Hosotani et al.
2018/0309373 A1   10/2018  Chang et al.
(Continued)

FOREIGN PATENT DOCUMENTS

CN        102570830 A     7/2012
CN        103891120 A     6/2014
(Continued)

OTHER PUBLICATIONS

Chen Zhangyong, et al., Asymmetrical Full-bridge Secondary Dual Resonance DC-DC Converters, Proceedings of the CSEE, Sep. 25, 2013, vol. 33 No.27.
(Continued)

*Primary Examiner* — Alex Torres-Rivera
(74) *Attorney, Agent, or Firm* — Yue (Robert) Xu; Apex Attorneys at Law, LLP

(57)        ABSTRACT

A DC-DC converter is provided, including a phase-shift full-bridge circuit, a primary side resonance circuit, a transformer, a secondary side resonance circuit and a rectification circuit that are connected in sequence, and a processor. The phase-shift full-bridge circuit is configured to convert a direct-current power output from the direct-current power supply to an alternating-current power. The rectification circuit is configured to rectify the alternating-current power output from the transformer, to output power to the load. The processor is configured to control the phase-shift full-bridge circuit to convert the direct-current power output from the direct-current power supply, and control an output power of the phase-shift full-bridge circuit; and the secondary side resonance circuit is configured to resonate in a case that a direction of a current through the transformer changes, to store energy and discharge accordingly, to supply power to the load.

9 Claims, 2 Drawing Sheets

(56)  References Cited

U.S. PATENT DOCUMENTS

| | | | | |
|---|---|---|---|---|
| 2019/0341855 A1* | 11/2019 | Kim | ..................... | H02M 7/219 |
| 2020/0144926 A1* | 5/2020 | Murakami | ........ | H02M 3/33573 |
| 2022/0173669 A1* | 6/2022 | Chen | ................ | H02M 3/33573 |
| 2023/0040992 A1* | 2/2023 | Wei | .................. | H02M 3/33584 |
| 2023/0198374 A1 | 6/2023 | Junjun et al. | | |

FOREIGN PATENT DOCUMENTS

| | | | |
|---|---|---|---|
| CN | 104638932 A | 5/2015 |
| CN | 105141138 A | 12/2015 |
| CN | 206313667 U | 7/2017 |
| CN | 111864915 A | 10/2020 |
| CN | 112928926 A | 6/2021 |
| JP | 2002209383 A | 7/2002 |
| WO | 2016198290 A1 | 12/2016 |

OTHER PUBLICATIONS

He Genhua et al., A secondary phase-shifted full-bridge soft switching converter with resonant voltage-doubler, Journal of Air Force Early Warning Academy, Jun. 2018, vol. 32 No. 3.

* cited by examiner

RESONANT ISOLATED DC-DC CONVERTER

DIRECT-CURRENT CONVERTER

The present application is the national phase of International Patent Application No. PCT/CN2021/103564, titled "DIRECT-CURRENT CONVERTER", filed on Jun. 30, 2021, which claims priority to Chinese Patent Application No. 202110182683.7, titled "DIRECT-CURRENT CONVERTER", filed on Feb. 8, 2021 with the China National Intellectual Property Administration, both of which are incorporated herein by reference in their entireties.

FIELD

The present disclosure relates to the technical field of power electronics, and in particular to a direct-current to direct current (DC-DC) converter.

BACKGROUND

In the conventional technology, a DC-DC converter includes a direct-current power supply, a full-bridge circuit, a transformer and a rectification circuit, as shown in FIG. 1 which is a schematic structural diagram of a DC-DC converter according to the conventional technology, where the DC-DC converter includes a processor, a phase-shift full-bridge circuit, a primary side resonance circuit, a transformer, a rectification circuit and a freewheeling inductor L2. The processor controls the phase-shift full-bridge circuit to convert direct-current power output from the direct-current power supply. The primary side resonance circuit resonates in a case that a direction of a current output from the phase-shift full-bridge circuit changes, so as to ensure a stable change of an input current of the transformer. The transformer adjusts a voltage output from the resonance circuit and achieves an isolation effect. The rectification circuit rectifies an alternating-current power output from the transformer to a direct-current power, which is supplied the load. In a case that a direction of a current through the transformer changes, the freewheeling inductor L2 stores energy and discharges correspondingly.

However, in a case that a direction of a current of the primary side of the transformer changes, that is, the current through the primary side of the transformer drops from positive to negative or rises from negative to positive, the current through the secondary side of the transformer changes accordingly. However, since a current through the freewheeling inductor L2 cannot change abruptly, in order to restrain a change of the current, the freewheeling inductor L2 discharges to generate a follow-on current. In a case that the freewheeling inductor L2 discharges, diodes D5 and D6 of the secondary side of the transformer are turned on simultaneously or diodes D7 and D8 are turned on simultaneously, the freewheeling inductor L2 supplies power to a load R. However, in this case, the freewheeling inductor L2, the load R, the diode D6 and the diode D5 form a loop, or the freewheeling inductor L2, the load R, the diode D8 and the diode D7 form a loop, such that the secondary side of the transformer is short-circuited, and the primary side of the transformer is short-circuited. The electric energy output from the phase-shift full-bridge circuit is stored in a resonant inductor in the primary side resonance circuit, and a voltage applied to the transformer is zero, leading to a loss of an output duty ratio of the transformer. In addition, in this case, the follow-on current from the freewheeling inductor L2 cannot provide an expected power for the load R. Therefore, a normal electricity requirement of the load R cannot be satisfied. In a case that all electric energy in the freewheeling inductor L2 is discharged, the transformer charges the freewheeling inductor.

SUMMARY

A method, an apparatus and a system for controlling a switching transistor, and a DC-DC converter are provided according to the present disclosure, to ensure that the switching transistor on a lagging leg is turned off at a small current, that is, the switching transistor operates in a soft-switching state, so as to reduce the loss and improve the anti-interference ability of the switching transistor, and improve the EMS performance of the switching transistor.

In order to solve the above technical problems, a DC-DC converter is provided according to the present disclosure. The DC-DC converter includes a phase-shift full-bridge circuit, a primary side resonance circuit, a transformer, a secondary side resonance circuit and a rectification circuit that are connected in sequence, and a processor, where an input terminal of the phase-shift full-bridge circuit is connected to a direct-current power supply, and the phase-shift full-bridge circuit is configured to convert a direct-current power output from the direct-current power supply to an alternating-current power;

an output terminal of the rectification circuit is connected to a load, and the rectification circuit is configured to rectify the alternating-current power output from the transformer, to output power to the load;

a signal output terminal of the processor is connected to a control terminal of the phase-shift full-bridge circuit, the processor is configured to control the phase-shift full-bridge circuit to convert the direct-current power output from the direct-current power supply, and control an output power of the phase-shift full-bridge circuit; and the secondary side resonance circuit is configured to resonate in a case that a direction of a current through the transformer changes, to store energy and discharge accordingly, to supply power to the load.

In an embodiment, the phase-shift full-bridge circuit includes a first switching transistor, a second switching transistor, a third switching transistor and a fourth switching transistor; where a first terminal of the first switching transistor and a first terminal of the third switching transistor are connected to form a first input terminal of the phase-shift full-bridge circuit, which is connected to a positive output terminal of the direct-current power supply;

a second terminal of the second switching transistor and a second terminal of the fourth switching transistor are connected to form a second input terminal of the phase-shift full-bridge circuit, which is connected to a negative output terminal of the direct-current power supply;

a second terminal of the first switching transistor and a first terminal of the second switching transistor are connected to form a first output terminal of the phase-shift full-bridge circuit, which is connected to a first terminal of the primary side resonance circuit;

a second terminal of the third switching transistor and a first terminal of the fourth switching transistor are connected to form a second output terminal of the phase-shift full-bridge circuit, which is connected to a second input terminal of the transformer;

a second terminal of the primary side resonance circuit is connected to a first input terminal of the transformer; and a signal output terminal of the processor is connected to a control terminal of the first switching transistor, a control terminal of the second switching transistor, a control terminal of the third switching transistor and a control terminal of the fourth switching transistor, the processor is configured to control the first switching transistor, the second switching transistor, the third switching transistor and the fourth switching transistor to be turned on or turned off, to control the phase-shift full-bridge circuit to convert the direct-current power output from the direct-current power supply to the alternating-current power, and control the output power of the phase-shift full-bridge circuit.

In an embodiment, the processor is configured to determine an expected value for the current through the transformer in the DC-DC converter based on an expected output power of the DC-DC converter; control, after a switching transistor on a lagging leg of the phase-shift full-bridge circuit is turned on and in a case that the current through the transformer reaches the expected value, a corresponding switching transistor on a leading leg of the phase-shift full-bridge circuit to be turned off, to control the phase-shift full-bridge circuit to convert the direct-current power to the alternating-current power, and control the output power of the phase-shift full-bridge circuit.

In an embodiment, the DC-DC converter further includes:

a current detection module, where an input terminal of the current detection module is connected to the transformer, an output terminal of the current detection module is connected to an input terminal of the processor, and the current detection module is configured to detect the current through the transformer;

the control, after the switching transistor on the lagging leg of the phase-shift full-bridge circuit is turned on and in a case that the current through the transformer reaches the expected value, the corresponding switching transistor on the leading leg of the phase- shift full-bridge circuit to be turned off includes:

control the corresponding switching transistor on the leading leg of the phase-shift full-bridge circuit to be turned off, after the switching transistor on the lagging leg of the phase-shift full-bridge circuit is turned on and in a case that the value of the current through the transformer detected by the current detection module reaches the expected current value.

In an embodiment, after the control, after the switching transistor on the lagging leg of the phase-shift full-bridge circuit is turned on and in a case that the current through the transformer reaches the expected value, the corresponding switching transistor on the leading leg of the phase-shift full-bridge circuit to be turned off, the processor is configured to:

determine, based on the expected value, a common on-period during which the switching transistor on the leading leg and the corresponding switching transistor on the lagging leg of the phase-shift full-bridge circuit are simultaneously turned on; and where the control, after the switching transistor on the lagging leg of the phase-shift full-bridge circuit is turned on and in a case that the current through the transformer reaches the expected value, the corresponding switching transistor on the leading leg of the phase-shift full-bridge circuit to be turned off includes:

control the corresponding switching transistor on the leading leg of the phase-shift full-bridge circuit to be turned off, at expiry of the common on-period from a time instant at which the switching transistor on the lagging leg of the phase-shift full-bridge circuit in the direct-current converter is turned on.

In an embodiment, the direct-current converter further includes:

a current detection module, where an input terminal of the current detection module is connected to the transformer, an output terminal of the current detection module is connected to an input terminal of the processor, and the current detection module is configured to detect the current through the transformer;

the determine, based on the expected value, the common on-period during which the switching transistor on the leading leg and the corresponding switching transistor on the lagging leg of the phase-shift full-bridge circuit are simultaneously turned on includes:

determine the common on-period to start from a time instant at which the switching transistor on the leading leg and the corresponding switching transistor on the lagging leg of the phase-shift full-bridge circuit are turned on simultaneously, and end at a time instant at which the current through the transformer detected by the current detection module reaches the expected value.

In an embodiment, the primary side resonance circuit includes:

a primary side resonant capacitor, where a first terminal of the primary side resonant capacitor serves as a first terminal of the primary side resonance circuit and is connected to a first output terminal of the phase-shift full-bridge circuit; and a primary side resonant inductor, where a first terminal of the primary side resonant inductor is connected to a second terminal of the primary side resonant capacitor, a second terminal of the primary side resonant inductor serves as a second terminal of the primary side resonance circuit and is connected to a first input terminal of the transformer;

the primary side resonant capacitor and the primary side resonant inductor are configured to resonate in a case that a direction of a current output from the phase-shift full-bridge circuit changes.

In an embodiment, the primary side resonance circuit includes:

a primary side resonant inductor, where a first terminal of the primary side resonant inductor serves as a first terminal of the primary side resonance circuit, and is connected to a first output terminal of the phase-shift full-bridge circuit, a second terminal of the primary side resonant inductor serves as a second terminal of the primary side resonance circuit and is connected to a first input terminal of the transformer; and the primary side resonant inductor is configured to resonant with a body capacitance of the corresponding switching transistors in the phase-shift full-bridge circuit, in a case that a direction of a current output from the phase-shift full-bridge circuit changes.

In an embodiment, the secondary side resonance circuit includes: a secondary side resonant inductor, a first secondary side resonant capacitor, and second secondary side resonant capacitor, where a first terminal of the secondary side resonant inductor is connected to a first output terminal of the transformer, and a second terminal of the secondary side resonant inductor is connected to a first terminal of the rectification circuit, and the secondary side resonant inductor is configured to discharge in the case that the direction of the current of the transformer changes, and store energy when fully discharged and in a case that a direction of a voltage output from the transformer remains unchanged;

a first terminal of the first secondary side resonant capacitor is connected to a second terminal of the rectification circuit and a first input terminal of the load, a second terminal of the first secondary side resonant capacitor is connected to a first terminal of the second secondary side resonant capacitor and a second output terminal of the transformer, and the first secondary side resonant capacitor is configured to discharge in a case that the direction of the current of the transformer is a first direction, and store energy in a case that the direction of the current of the transformer is a second direction; and a second terminal of the second secondary side resonant capacitor is connected to a third terminal of the rectification circuit and a second input terminal of the load, the second secondary side resonant capacitor is configured to store energy in the case that the direction of the current of the transformer is the first direction, and discharge in the case that the direction of the current of the transformer is the second direction.

In an embodiment, the rectification circuit includes a first diode and a second diode; where a first terminal of the first diode serves as the second terminal of the rectification circuit and is connected to the first input terminal of the load;

a second terminal of the first diode is connected to a first terminal of the second diode at a connection point, which serves as the first terminal of the rectification circuit and is connected to the second terminal of the secondary side resonant inductor;

a second terminal of the second diode serves as the third terminal of the rectification circuit and is connected to the second input terminal of the load; and the rectification circuit is configured to rectify the alternating-current power output from the transformer to the direct-current power in cooperation with the secondary side resonance circuit, to supply power to the load.

A DC-DC converter is provided according to the present disclosure. The DC-DC converter is provided with a processor, a phase-shift full-bridge circuit, a primary side resonance circuit, a transformer, a secondary side resonance circuit and a rectification circuit. The transformer outputs alternating-current power, and the secondary side resonance circuit stores energy and discharges in the case that the direction of the current through the transformer changes. In the case that the direction of the current through the transformer changes, the secondary side resonance circuit stores the electric energy output from the transformer, and discharge the electric energy stored before the direction of the current of the transformer changes, so as to supply power to the load. The electric energy output from the transformer is stored in the secondary side resonance circuit, and is output to the load through the secondary side resonance circuit. It can be seen that according to the present disclosure, in the case that the direction of the current through the transformer changes, the secondary side resonance circuit stores energy and discharges accordingly, such that the transformer can output normally, and the loss of the output duty ratio of the transformer is avoided.

BRIEF DESCRIPTION OF THE DRAWINGS

In order to illustrate technical solutions in embodiments of the present disclosure more clearly, drawings to be used in the description of the embodiments or the conventional technology are introduced simply hereinafter. It is apparent that the drawings described below show only some embodiments of the present disclosure, and other drawings may be obtained by those skilled in the art based on the provided drawings without any creative effort.

DETAILED DESCRIPTION

A method, a system and an apparatus for controlling a switching transistor, and a DC-DC converter are provided according to the present disclosure, so as to ensure that the switching transistor on a lagging leg is turned off at a small current, in other words, ensure that the switching transistor operates in a soft-switching state, thereby reducing loss of the switching transistor, and improving anti-interference ability of the switching transistor and EMS performance of the switching transistor.

Technical solutions in the embodiments of the present disclosure are described clearly and completely below in conjunction with the drawings in the embodiments of the present disclosure, so that the objectives, technical solutions and advantages of the embodiments of the present disclosure become clearer. Apparently, the embodiments described are only some rather than all of the embodiments of the present disclosure. Any other embodiments obtained by those skilled in the art based on the embodiments in the present disclosure without any creative effort shall fall within the protection scope of the present disclosure.

Figure 2:
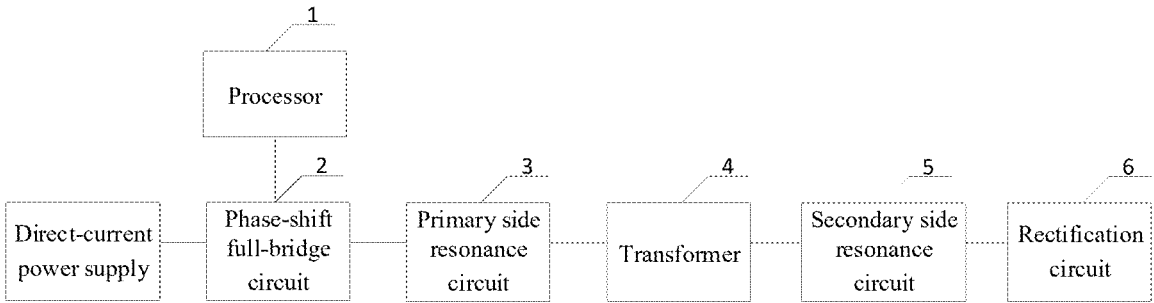
FIG. 2 is a schematic structural diagram of a DC-DC converter according to an embodiment of the present disclosure.

Reference is made to FIG. 2, which is a schematic structural diagram of a DC-DC converter according to the present disclosure.

The DC-DC converter includes a phase-shift full-bridge circuit 2, a primary side resonance circuit 3, a transformer 4, a secondary side resonance circuit 5 and a rectification circuit 6 connected in sequence, and a processor 1.

An input terminal of the phase-shift full-bridge circuit 2 is connected to a direct-current power supply E, and the phase-shift full-bridge circuit 2 is configured to convert a direct-current power output from the direct-current power supply E to an alternating-current power.

An output terminal of the rectification circuit 6 is connected to a load, and the rectification circuit 6 is configured to rectify an alternating-current power output from the transformer 4 to output power to the load.

A signal output terminal of the processor 1 is connected to a control terminal of the phase-shift full-bridge circuit 2, the processor 1 is configured to control the phase-shift full-bridge circuit 2 to convert the direct-current power output from the direct-current power supply E, and control an output power of the phase-shift full-bridge circuit 2.

The secondary side resonance circuit 5 is configured to resonate in a case that a direction of a current through the transformer 4 changes, to store energy and discharge accordingly, to supply power to the load.

Figure 1:
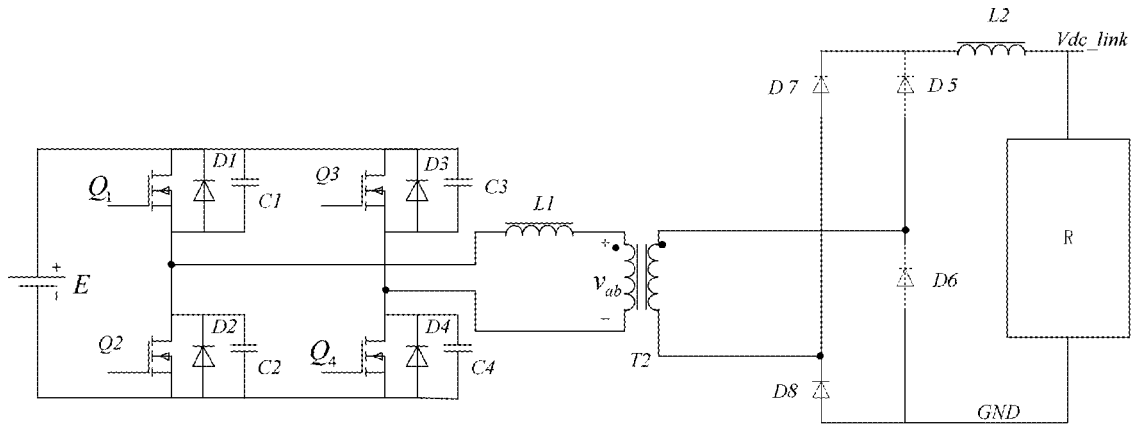
FIG. 1 is a schematic structural diagram of a DC-DC converter according to the conventional technology.

In this embodiment, the DC-DC converter in the conventional technology is provided with the processor 1, the phase-shift full-bridge circuit 2, the primary side resonance circuit 3, the transformer 4, the rectification circuit 6 and the freewheeling inductor L2 as shown in FIG. 1. The processor 1 controls the switching transistor in the phase-shift full-bridge circuit 2 to cause the phase-shift full-bridge circuit 2 to convert the direct-current power output from the direct-current power supply E to the alternating-current power that is output to the transformer 4. The primary side resonance circuit 3 arranged between the phase-shift full-bridge circuit 2 and the transformer 4 stabilizes the alternating-current power output from the phase-shift full-bridge circuit 2 to the transformer 4. The transformer 4 isolates a current through the primary side from a current through the secondary side. The rectification circuit 6 rectifies the alternating-current power output from the transformer 4 to the direct-current power, to supply power to the load. Since the freewheeling inductor L2 is provided, and the current through the freewheeling inductor L2 does not change abruptly, stability of the current input to the load is ensured. However, in a case that the direction of current through the primary side of the transformer 4 changes, for example, in a case that the current through the primary side of the transformer 4 drops from positive to negative, or rises from negative to positive, the current through the freewheeling inductor L2 cannot change abruptly, and the freewheeling inductor L2 discharges first. In a case that the freewheeling inductor L2 discharges, the freewheeling inductor L2, the load and two diodes on a same leg of the rectification circuit 6 form a loop. As a result, the secondary side of the transformer 4 is short-circuited. Further, since the current through the primary side of the transformer 4 is determined by the secondary side, the current through the primary side of the transformer 4 is zero, the voltage output from the phase-shift full-bridge circuit 2 is applied to the primary side resonance circuit 3, and the voltage input to the transformer 4 is 0V, leading to the loss of the output duty ratio of the transformer 4, thus the power supply cannot input power to the load, the power requirement of the load cannot be satisfied.

In order to solve the above problem, according to the present disclosure, the DC-DC converter is further provided with a secondary side resonance circuit 5, which stores energy and discharges in a case that a direction of a current through the transformer changes, to ensure that the secondary side of the transformer 4 is not short-circuited, and the transformer 4 can normally output current to the load, that is, the loss of the output duty ratio of the transformer 4 is avoided.

In the case that the direction of the current through the transformer 4 changes, the secondary side resonance circuit 5 discharges the energy stored before the direction of the current changes to supply power to the load. Meanwhile, the secondary side resonance circuit 5 further stores energy, so that the electric energy output from the transformer 4 is stored in the secondary side resonance circuit 5. Therefore, stability of the current output to the load is ensured, the transformer 4 can output electric energy normally, satisfying the electricity requirements of the load, and avoiding the loss of the output duty ratio of the transformer 4.

In summary, according to the present disclosure, in the case that the direction of the current through the transformer 4 changes, the secondary side resonance circuit 5 stores energy and discharge correspondingly, the transformer 4 outputs normally, that is, it is ensured that the output duty ratio of transformer 4 is not lost.

Based on the above embodiments, in an embodiment, the phase-shift full-bridge circuit 2 includes a first switching transistor Q1, a second switching transistor Q2, a third switching transistor Q3 and a fourth switching transistor Q4.

A first terminal of the first switching transistor Q1 and a first terminal of the third switching transistor Q3 are con-nected to form a first input terminal of the phase-shift full-bridge circuit 2, which is connected to a positive output terminal of the direct-current power supply E.

A second terminal of the second switching transistor Q2 and a second terminal of the fourth switching transistor Q4 are connected to form a second input terminal of the phase-shift full-bridge circuit 2, which is connected to a negative output terminal of the direct-current power supply E.

A second terminal of the first switching transistor Q1 and a first terminal of the second switching transistor Q2 are connected to form a first output terminal of the phase-shift full-bridge circuit 2, which is connected to a first terminal of the primary side resonance circuit 3.

A second terminal of the third switching transistor Q3 and a first terminal of the fourth switching transistor Q4 are connected to form a second output terminal of the phase-shift full-bridge circuit 2, which is connected to a second input terminal of the transformer 4.

A second terminal of the primary side resonance circuit 3 is connected to a first input terminal of the transformer 4.

A signal output terminal of the processor 1 is connected to a control terminal of the first switching transistor Q1, a control terminal of the second switching transistor Q2, a control terminal of the third switching transistor Q3 and a control terminal of the fourth switching transistor Q4. The processor 1 is configured to control the first switching transistor Q1, the second switching transistor Q2, the third switching transistor Q3 and the fourth switching transistor Q4 to be turned on or turned off, so as to control the phase-shift full-bridge circuit 2 to convert the direct-current power output from the direct-current power supply E to the alternating-current power, and control the output power of the phase-shift full-bridge circuit 2.

Figure 3:
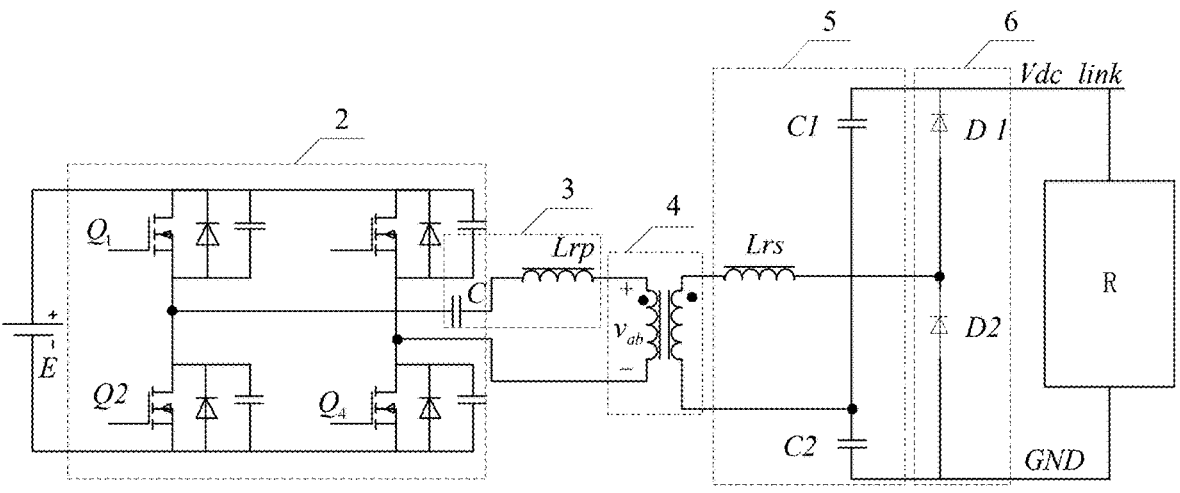
FIG. 3 is a schematic diagram showing a structure of a DC-DC converter according to an embodiment of the present disclosure.

Reference is made to FIG. 3, which is a schematic diagram of a structure of a DC-DC converter according to the present disclosure. According to the present disclosure, the phase-shift full-bridge circuit 2 is provided with four switching transistors, the processor 1 controls the output power of phase-shift full-bridge circuit 2 by controlling each switching transistor to be turned on or off. Therefore, according to the present disclosure, the output power of phase-shift full-bridge circuit 2 is adjustable and can satisfy the requirements of loads.

In an embodiment, the processor 1 is configured to determine an expected value for the current through the transformer 4 in the DC-DC converter based on an expected output power of the DC-DC converter, control a switching transistor on a leading leg of the phase-shift full-bridge circuit 2 to be turned off after a corresponding switching transistor on the lagging leg of the phase-shift full-bridge circuit 2 is turned on and in a case that the current through the transformer 4 reaches the expected value, so as to control the phase-shift full-bridge circuit 2 to convert the direct-current power output from the direct-current power supply E to the alternating-current power, and control the output power of the phase-shift full-bridge circuit 2.

In an embodiment, the processor 1 calculates the expected output power of the DC-DC converter based on a load currently connected to the DC-DC converter, and calculates the expected value for the current through the transformer 4 that causes the DC-DC converter to output the expected output power. Based on this, the processor 1 controls each switching transistor in phase-shift full-bridge circuit 2 to enable the DC-DC converter to output the expected power.

In an embodiment, in the phase-shift full-bridge circuit 2, a leg on which the first switching transistor Q1 and the second switching transistor Q2 are located is the leading leg, and a leg on which the third switching transistor Q3 and the fourth switching transistor Q4 are located is the lagging leg. A phase-shift angle period is preset in the processor 1. From the time instant at which the switching transistor on the leading leg is turned on and at the expiry of the phase-shift angle period, the corresponding switching transistor on the lagging leg is controlled to be turned on. Correspondingly, from the time instant at which the switching transistor on the leading leg is turned off and at the expiry of the phase-shift angle period, the corresponding switching transistor on the lagging leg is controlled to be turned off. For example, from the time instant at which the first switching transistor Q1 is turned on and at the expiry of the phase-shift angle period, the fourth switching transistor Q4 is controlled to be turned on; correspondingly, from the time instant at which the first switching transistor Q1 is turned off and at the expiry of the phase-shift angle period, the fourth switching transistor is controlled to be turned off. For example, from the time instant at which the second switching transistor Q2 is turned on and at the expiry of the phase-shift angle period, the third switching transistor Q3 is controlled to be turned on; correspondingly, from the time instant at which the second switching transistor Q2 is turned off and at the expiry of the phase-shift angle period, the third switching transistor Q3 is controlled to be turned off.

In a case that the current through the transformer 4 reaches the expected value, the processor 1 controls each switching transistor to be turned on or off, so that the phase-shift full-bridge circuit 2 outputs a corresponding power, and the DC-DC converter outputs the expected power to the load, thereby satisfying the power requirements of the load.

In an embodiment, the DC-DC converter further includes a current detection module.

An input terminal of the current detection module is connected to the transformer 4, an output terminal of the current detection module is connected to the input terminal of the processor 1, and the current detection module is configured to detect the current through the transformer 4.

The controlling, after the switching transistor on the lagging leg of the phase-shift full-bridge circuit 2 is turned on and in the case that the current through the transformer 4 reaches the expected value, the corresponding switching transistor on the leading leg of the phase-shift full-bridge circuit 2 to be turned off includes:

controlling, after the switching transistor on the lagging leg of the phase-shift full-bridge circuit 2 is turned on and the current through the transformer 4 detected by the current detection module reaches the expected current value, the corresponding switching transistor on the leading leg of the phase-shift full-bridge circuit 2 to be turned off.

In this embodiment, the current detection module is provided to detect the current through the transformer 4, so that the processor 1 controls the switching transistors in the phase-shift full-bridge circuit 2 in a case that the current through the transformer 4 reaches the expected value. That is, the processor 1 controls the switching transistor on the leading leg to be turned off, so that the phase-shift full-bridge circuit 2 stops outputting power. In this case, the output power of the DC-DC converter is the expected power.

In an embodiment, after the controlling, after the switching transistor on the lagging leg of the phase-shift full-bridge circuit 2 is turned on and in the case that the current through the transformer 4 reaches the expected value, the corresponding switching transistor on the leading leg of the phase-shift full-bridge circuit 2 to be turned off, the processor is further configured to:

determine, based on the expected value, a common on-period during which the switching transistor on the leading leg and the corresponding switching transistor on the lagging leg of the phase-shift full-bridge circuit 2 are simultaneously turned on.

The controlling, after the switching transistor on the lagging leg of the phase-shift full-bridge circuit 2 is turned on and in the case that the current through the transformer 4 reaches the expected value, the corresponding switching transistor on the leading leg of the phase-shift full-bridge circuit 2 to be turned off includes:

controlling the corresponding switching transistor on the leading leg of the phase-shift full-bridge circuit 2 to be turned off at expiry of the common on-period from a time instant at which the switching transistor on the lagging leg of the phase-shift full-bridge circuit in the direct-current converter is turned on.

In this embodiment, by setting the common on-period of the first switching transistor Q1 and the fourth switching transistor Q4, and the common on-period of the second switching transistor Q2 and the third switching transistor Q3, the processor 1 controls the switching transistor on the leading leg to be turned off at the expiry of the common on-period from the time instant at which the switching transistor on the lagging leg is turned on. As a result, in a case that the current through the transformer 4 reaches the expected value, the processor 1 controls the switching transistor on the leading leg to be turned off. In addition, the common on-period of the first switching transistor Q1 and the fourth switching transistor Q4 is the same as the common on-period of the second switching transistor Q2 and the third switching transistor Q3. The first switching transistor Q1 is controlled to be turned off at the expiry of the common on-period from the time instant at which the fourth switching transistor Q4 is turned on; and the second switching transistor Q2 is controlled to be turned off at the expiry of the common on-period from the time instant at which the third switching transistor Q3 is turned on, so as to ensure that the DC-DC converter outputs the expected power.

In an embodiment, the DC-DC converter further includes a current detection module.

An input terminal of the current detection module is connected to the transformer 4, an output terminal of the current detection module is connected to the input terminal of the processor 1, and the current detection module is configured to detect the current through the transformer 4.

The determining, based on the expected value, a common on-period during which the switching transistor on the leading leg and the corresponding switching transistor on the lagging leg of the phase-shift full-bridge circuit 2 are simultaneously turned on includes:

determining the common on-period to start from a time instant at which the switching transistor on the leading leg and the corresponding switching transistor on the lagging leg of the phase-shift full-bridge circuit 2 are turned on simultaneously, and end at a time instant at which the current through the transformer 4 detected by the current detection module reaches the expected value.

In an embodiment, when determining the common on-period, the current when the switching transistor on the leading leg and the corresponding switching transistor on the lagging leg are turned off is detected. The common on-period is determined to start from the time instant at which the switching transistor on the leading leg and the corresponding switching transistor on the lagging leg of the phase-shift full-bridge circuit 2 are turned on simultaneously, and end at a time instant at which the current through the transformer 4 detected by the current detection module reaches the expected value. In a case that the processor 1 controls the switching transistors in the phase-shifting full-bridge circuit 2, the processor 1 may directly control each switching transistor based on the common on-period.

In an embodiment, the primary side resonance circuit 3 includes a primary side resonant capacitor C and a primary side resonant inductor Lrp.

A first terminal of the primary side resonant capacitor C serves as a first terminal of the primary side resonance circuit 3, which is connected to a first output terminal of the phase-shift full-bridge circuit 2.

A first terminal of the primary side resonant inductor Lrp is connected to a second terminal of the primary side resonant capacitor C, a second terminal of the primary side resonant inductor Lrp serves as the second terminal of the primary side resonance circuit 3, which is connected to the first input terminal of the transformer 4.

The primary side resonant capacitor C and the primary side resonant inductor Lrp are configured to resonate in the case that the direction of the current output from the phase-shift full-bridge circuit 2 changes.

Reference is made to FIG. 3, in this embodiment, the primary side resonant capacitor C and the primary side resonant inductor Lrp are provided in the primary side resonance circuit 3, and the primary side resonant capacitor C and the primary side resonant inductor Lrp resonant, so as to ensure that the current input to the transformer 4 remains stable in the case that the direction of the current output from the phase-shift full-bridge circuit 2 changes.

In an embodiment, the primary side resonance circuit 3 includes a primary side resonant inductor Lrp.

The first terminal of the primary side resonant inductor Lrp serves as the first terminal of the primary side resonance circuit 3, which is connected to the first output terminal of the phase-shift full-bridge circuit 2. The second terminal of the primary side resonant inductor Lrp serves as the second terminal of the primary side resonance circuit 3, which is connected to the first input terminal of the transformer 4. The primary side resonant inductor Lrp is configured to resonant with the body capacitance of the corresponding switching transistors in the phase-shift full-bridge circuit 2, in a case that the direction of the current output from the phase-shift full-bridge circuit 2 changes.

Figure 4:
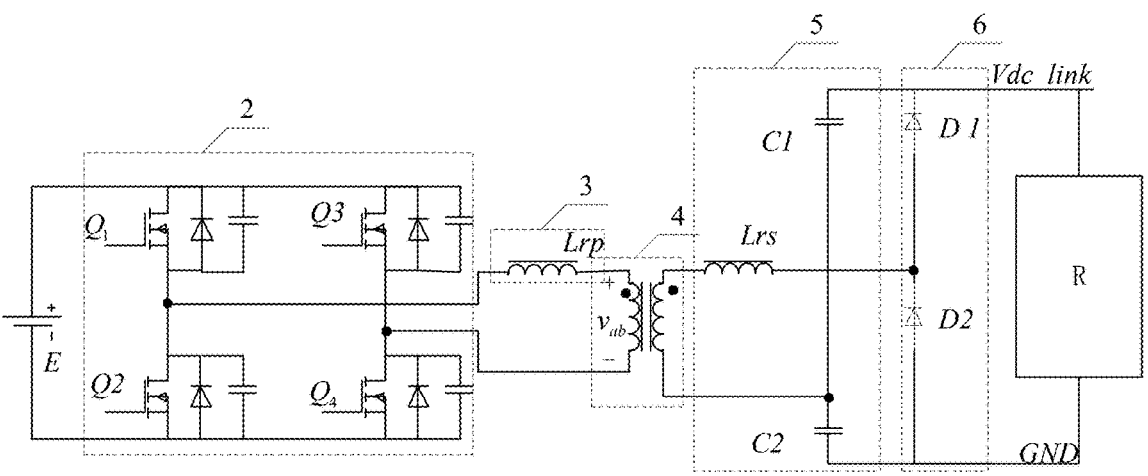
FIG. 4 is a schematic diagram showing a structure of a DC-DC converter according to another embodiment of the present disclosure.

Reference is made to FIG. 4, which is a schematic diagram showing a structure of a DC-DC converter according to another embodiment of the present disclosure. In this embodiment, the primary side resonance circuit 3 is provided with only a primary side resonant inductor Lrp. Each switching transistor of the phase-shift full-bridge circuit 2 has a body capacitance, and the primary side resonant inductor Lrp resonates with the body capacitance of the corresponding switching transistors in the phase-shift full-bridge circuit 2, so that the current input to transformer 4 remains stable in the case that the direction of the current output from the phase-shift full-bridge circuit 2 changes.

In an embodiment, the secondary side resonance circuit 5 includes a secondary side resonant inductor Lrs, a first secondary side resonant capacitor C1 and a second secondary side resonant capacitor C2.

A first terminal of the secondary side resonant inductor Lrs is connected to a first output terminal of the transformer 4, and a second terminal of the secondary side resonant inductor Lrs is connected to a first terminal of the rectification circuit 6. The secondary side resonant inductor Lrs is configured to discharge in the case that the direction of the current through the transformer 4 changes, and store energy when fully discharged and in a case that the direction of the output voltage of the transformer 4 is unchanged.

A first terminal of the first secondary side resonant capacitor C1 is connected to a second terminal of the rectification circuit 6 and a first input terminal of the load, a second terminal of the first secondary side resonant capacitor C1 is connected to a first terminal of the second secondary side resonant capacitor C2 and a second output terminal of the transformer 4. The first secondary side resonant capacitor C1 is configured to discharge in a case that the direction of the current through the transformer 4 is a first direction, and store energy in a case that the direction of the current through the transformer 4 is a second direction.

A second terminal of the second secondary side resonant capacitor C2 is connected to the third terminal of the rectification circuit 6 and a second input terminal of the load, the second secondary side resonant capacitor C2 is configured to store energy in the case that the direction of the current through the transformer 4 is the first direction, and discharge in the case that the direction through the current of the transformer 4 is the second direction.

In this embodiment, the secondary side resonance circuit 5 is provided with the secondary side resonant inductor Lrs, the first secondary side resonant capacitor C1 and the second secondary side resonant capacitor C2, where the first secondary side resonant capacitor C1 and the second secondary side resonant capacitor C2 are charged or discharge in a case that the current through the transformer 4 is a certain direction, and are not affected by the change in the amplitude of the current through the transformer 4, ensuring that the current input to the load is stable, further ensuring that the transformer 4 can output normally, so as to eliminate the loss of the output duty ratio of the transformer 4.

The first direction may be from a same-polarity terminal of the transformer 4 to an opposite-polarity terminal of the transformer 4, and the second direction may be from the opposite-polarity terminal of the transformer 4 to the same-polarity terminal of the transformer 4, which are not limited in the present disclosure and depends on the input direction of the load.

In an embodiment, the rectification circuit 6 includes a first diode D1 and a second diode D2.

A first terminal of the first diode D1 serves as the second terminal of the rectification circuit 6, which is connected to the first input terminal of the load.

A second terminal of the first diode D1 and a first terminal of the second diode D2 are connected at a connection point, which serves as the first terminal of the rectification circuit 6 and is connected to the second terminal of the secondary side resonant inductor Lrs.

A second terminal of the second diode D2 serves as a third terminal of the rectification circuit 6, which is connected to the second input terminal of the load.

The rectification circuit 6 is configured to rectify, in cooperation with the secondary side resonance circuit 5, the alternating-current power output from the transformer 4 to a direct-current power supplied to the load.

In this embodiment, the rectification circuit 6 includes two diodes, the rectification circuit 6 cooperates with the secondary side resonance circuit 5 to rectify the alternating-current power output from the transformer 4 to the direct-current power. In an embodiment, in a case that the first secondary resonant capacitor C1 is charged, the first diode D1 is turned on, and in a case that the second secondary resonant capacitor C2 is charged, the second diode D2 is turned on, so that the secondary resonance circuit 5 discharges to the load to supply power to the load.

In an embodiment, the first diode D1 and the second diode D2 according to the present disclosure may be replaced by MOSs (metal oxide semiconductors), which is not limited in the present disclosure and as long as the alternating-current power output from the transformer 4 can be rectified to the direct-current power.

It should be noted that, in the specification, relative terms such as first and second are only used herein to distinguish one entity or operation from another, instead of necessitating or implying such actual relationship or order between entities or operations. Furthermore, the term "comprise", "include" or any other variants thereof are intended to be non-exclusive, such that a process, method, article, or device including a set of elements includes not only those elements, but also elements not expressly listed, or elements inherent in such process, method, article, or device. Unless expressively limited otherwise, the statement "comprising/including a(n) . . . " does not exclude existence of another identical element in such process, method, article or device including the elements.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Therefore, the present disclosure should accord with the widest scope consistent with the principles and novel features disclosed herein instead of being limited to the embodiments shown herein.

The invention claimed is:

1. A direct-current to direct-current (DC-DC) converter, comprising a phase-shift full-bridge circuit, a primary side resonance circuit, a transformer, a secondary side resonance circuit and a rectification circuit that are connected in sequence, and a processor, wherein
    an input terminal of the phase-shift full-bridge circuit is connected to a direct-current power supply, and the phase-shift full-bridge circuit is configured to convert a direct-current power output from the direct-current power supply to an alternating-current power;
    an output terminal of the rectification circuit is connected to a load, and the rectification circuit is configured to rectify the alternating-current power output from the transformer, to output power to the load;
    a signal output terminal of the processor is connected to a control terminal of the phase-shift full-bridge circuit, the processor is configured to control the phase-shift full-bridge circuit to convert the direct-current power output from the direct-current power supply, and control an output power of the phase-shift full-bridge circuit;
    the secondary side resonance circuit is configured to resonate in a case that a direction of a current through the transformer changes, to store energy and discharge accordingly, to supply power to the load, and
    the processor is further configured to determine an expected value for the current through the transformer in the DC-DC converter based on an expected output power of the DC-DC converter; control, after a switching transistor on a lagging leg of the phase-shift full-bridge circuit is turned on and in a case that the current through the transformer reaches the expected value, a corresponding switching transistor on a leading leg of the phase-shift full-bridge circuit to be turned off, to control the phase-shift full-bridge circuit to convert the direct-current power to the alternating-current power, and control the output power of the phase-shift full-bridge circuit.

2. The DC-DC converter according to claim 1, wherein the phase-shift full-bridge circuit comprises a first switching transistor, a second switching transistor, a third switching transistor and a fourth switching transistor;
    a first terminal of the first switching transistor and a first terminal of the third switching transistor are connected to form a first input terminal of the phase-shift full-bridge circuit, which is connected to a positive output terminal of the direct-current power supply;
    a second terminal of the second switching transistor and a second terminal of the fourth switching transistor are connected to form a second input terminal of the phase-shift full-bridge circuit, which is connected to a negative output terminal of the direct-current power supply;
    a second terminal of the first switching transistor and a first terminal of the second switching transistor are connected to form a first output terminal of the phase-shift full-bridge circuit, which is connected to a first terminal of the primary side resonance circuit;
    a second terminal of the third switching transistor and a first terminal of the fourth switching transistor are connected to form a second output terminal of the phase-shift full-bridge circuit, which is connected to a second input terminal of the transformer;
    a second terminal of the primary side resonance circuit is connected to a first input terminal of the transformer; and
    a signal output terminal of the processor is connected to a control terminal of the first switching transistor, a control terminal of the second switching transistor, a control terminal of the third switching transistor and a control terminal of the fourth switching transistor, the processor is configured to control the first switching transistor, the second switching transistor, the third switching transistor and the fourth switching transistor to be turned on or turned off, to control the phase-shift full-bridge circuit to convert the direct-current power output from the direct-current power supply to the alternating-current power, and control the output power of the phase-shift full-bridge circuit.

3. The DC-DC converter according to claim 1, further comprising:
    a current detection module, wherein an input terminal of the current detection module is connected to the transformer, an output terminal of the current detection module is connected to an input terminal of the processor, and the current detection module is configured to detect the current through the transformer;
    the control, after the switching transistor on the lagging leg of the phase-shift full-bridge circuit is turned on and in a case that the current through the transformer reaches the expected value, the corresponding switching transistor on the leading leg of the phase-shift full-bridge circuit to be turned off comprises:
    control the corresponding switching transistor on the leading leg of the phase-shift full-bridge circuit to be turned off, after the switching transistor on the lagging leg of the phase-shift full-bridge circuit is turned on and in a case that the value of the current through the transformer detected by the current detection module reaches the expected current value.

4. The DC-DC converter according to claim 1, wherein after the control, after the switching transistor on the lagging leg of the phase-shift full-bridge circuit is turned on and in a case that the current through the transformer reaches the expected value, the corresponding switching transistor on the leading leg of the phase-shift full-bridge circuit to be turned off, the processor is configured to:

determine, based on the expected value, a common on-period during which the switching transistor on the leading leg and the corresponding switching transistor on the lagging leg of the phase-shift full-bridge circuit are simultaneously turned on; and wherein the control, after the switching transistor on the lagging leg of the phase-shift full-bridge circuit is turned on and in a case that the current through the transformer reaches the expected value, the corresponding switching transistor on the leading leg of the phase-shift full-bridge circuit to be turned off comprises:

control the corresponding switching transistor on the leading leg of the phase-shift full-bridge circuit to be turned off, at expiry of the commo on-period from a time instant at which the switching transistor on the lagging leg of the phase-shift full-bridge circuit in the direct-current converter is turned on.

5. The DC-DC converter according to claim 4, further comprising:

a current detection module, wherein an input terminal of the current detection module is connected to the transformer, an output terminal of the current detection module is connected to an input terminal of the processor, and the current detection module is configured to detect the current through the transformer;

the determine, based on the expected value, the common on-period during which the switching transistor on the leading leg and the corresponding switching transistor on the lagging leg of the phase-shift full-bridge circuit are simultaneously turned on comprises:

determine the common on-period to start from a time instant at which the switching transistor on the leading leg and the corresponding switching transistor on the lagging leg of the phase-shift full-bridge circuit are turned on simultaneously, and end at a time instant at which the current through the transformer detected by the current detection module reaches the expected value.

6. The DC-DC converter according to claim 1, wherein the primary side resonance circuit comprises:

a primary side resonant capacitor, wherein a first terminal of the primary side resonant capacitor serves as a first terminal of the primary side resonance circuit and is connected to a first output terminal of the phase-shift full-bridge circuit; and a primary side resonant inductor, wherein a first terminal of the primary side resonant inductor is connected to a second terminal of the primary side resonant capacitor, a second terminal of the primary side resonant inductor serves as a second terminal of the primary side resonance circuit and is connected to a first input terminal of the transformer;

the primary side resonant capacitor and the primary side resonant inductor are configured to resonate in a case that a direction of a current output from the phase-shift full-bridge circuit changes.

7. The DC-DC converter according to claim 1, wherein the primary side resonance circuit comprises:

a primary side resonant inductor, wherein a first terminal of the primary side resonant inductor serves as a first terminal of the primary side resonance circuit, and is connected to a first output terminal of the phase-shift full-bridge circuit, a second terminal of the primary side resonant inductor serves as a second terminal of the primary side resonance circuit and is connected to a first input terminal of the transformer; and the primary side resonant inductor is configured to resonant with a body capacitance of the corresponding switching transistors in the phase-shift full-bridge circuit, in a case that a direction of a current output from the phase-shift full-bridge circuit changes.

8. The DC-DC converter according to claim 1, wherein the secondary side resonance circuit comprises: a secondary side resonant inductor, a first secondary side resonant capacitor, and second secondary side resonant capacitor, wherein a first terminal of the secondary side resonant inductor is connected to a first output terminal of the transformer, and a second terminal of the secondary side resonant inductor is connected to a first terminal of the rectification circuit, and the secondary side resonant inductor is configured to discharge in the case that the direction of the current of the transformer changes, and store energy when fully discharged and in a case that a direction of a voltage output from the transformer remains unchanged;

a first terminal of the first secondary side resonant capacitor is connected to a second terminal of the rectification circuit and a first input terminal of the load, a second terminal of the first secondary side resonant capacitor is connected to a first terminal of the second secondary side resonant capacitor and a second output terminal of the transformer, and the first secondary side resonant capacitor is configured to discharge in a case that the direction of the current of the transformer is a first direction, and store energy in a case that the direction of the current of the transformer is a second direction; and a second terminal of the second secondary side resonant capacitor is connected to a third terminal of the rectification circuit and a second input terminal of the load, the second secondary side resonant capacitor is configured to store energy in the case that the direction of the current of the transformer is the first direction, and discharge in the case that the direction of the current of the transformer is the second direction.

9. The DC-DC converter according to claim 8, wherein the rectification circuit comprises a first diode and a second diode, wherein a first terminal of the first diode serves as the second terminal of the rectification circuit and is connected to the first input terminal of the load;

a second terminal of the first diode is connected to a first terminal of the second diode at a connection point, which serves as the first terminal of the rectification circuit and is connected to the second terminal of the secondary side resonant inductor;

a second terminal of the second diode serves as the third terminal of the rectification circuit and is connected to the second input terminal of the load; and the rectification circuit is configured to rectify the alternating-current power output from the transformer to the direct-current power in cooperation with the secondary side resonance circuit, to supply power to the load.

\* \* \* \* \*